United States Patent
Kruse

(10) Patent No.: US 10,994,720 B2
(45) Date of Patent: May 4, 2021

(54) METHOD FOR OPERATING A START-STOP SYSTEM AND A MOTOR VEHICLE

(71) Applicant: AUDI AG, Ingolstadt (DE)

(72) Inventor: Alexander Kruse, Ingolstadt (DE)

(73) Assignee: AUDI AG, Ingolstadt (DE)

(*) Notice: Subject to any disclaimer, the term of this patent is extended or adjusted under 35 U.S.C. 154(b) by 65 days.

(21) Appl. No.: 15/762,380

(22) PCT Filed: Aug. 12, 2016

(86) PCT No.: PCT/EP2016/001390
§ 371 (c)(1),
(2) Date: Mar. 22, 2018

(87) PCT Pub. No.: WO2017/050411
PCT Pub. Date: Mar. 30, 2017

(65) Prior Publication Data
US 2018/0273020 A1   Sep. 27, 2018

(30) Foreign Application Priority Data

Sep. 25, 2015   (DE) ............... 10 2015 012 552.4

(51) Int. Cl.
*B60W 20/12* (2016.01)
*F02N 11/08* (2006.01)
(Continued)

(52) U.S. Cl.
CPC ............ *B60W 20/12* (2016.01); *B60L 7/10* (2013.01); *B60W 10/06* (2013.01); *B60W 10/08* (2013.01);
(Continued)

(58) Field of Classification Search
CPC ......... B60W 20/12; B60W 10/06; B60L 7/10; F02N 11/0837
(Continued)

(56) References Cited

U.S. PATENT DOCUMENTS 9,140,565 B2    9/2015  Taguchi
9,567,966 B2 *  2/2017  Romanato ........... F02N 11/0837
(Continued)

FOREIGN PATENT DOCUMENTS

CN          1154525 A    7/1997
CN         104564364 A   4/2015
(Continued)

OTHER PUBLICATIONS

International Preliminary Report on Patentability directed to related International Patent Application No. PCT/EP2016/001390, dated Dec. 14, 2017, with attached English-language translation; 11 pages.
(Continued)

*Primary Examiner* — Peter D Nolan
*Assistant Examiner* — Wae L Louie
(74) *Attorney, Agent, or Firm* — Sterne, Kessler, Goldstein & Fox P.L.L.C.

(57) ABSTRACT

This disclosure relates to a method for operating a start-stop system of a motor vehicle. The method include cutting off a drive motor when the speed of the motor vehicle falls below a speed threshold. The speed threshold is determined depending on at least one piece of environment-related information.

10 Claims, 2 Drawing Sheets

(51) Int. Cl.
    *B60L 7/10*           (2006.01)
    *B60W 10/06*        (2006.01)
    *B60W 10/08*        (2006.01)

(52) U.S. Cl.
    CPC ...... *F02N 11/0833* (2013.01); *F02N 11/0837* (2013.01); *B60W 2555/60* (2020.02); *B60Y 2200/92* (2013.01); *F02N 11/0822* (2013.01); *F02N 2200/0801* (2013.01); *F02N 2200/12* (2013.01); *F02N 2200/123* (2013.01); *F02N 2200/125* (2013.01); *F02N 2300/306* (2013.01); *Y02T 10/40* (2013.01); *Y10S 903/93* (2013.01)

(58) Field of Classification Search
    USPC .......................................................... 701/22
    See application file for complete search history.

(56) References Cited

U.S. PATENT DOCUMENTS

| | | | |
|---|---|---|---|
| 9,731,698 B1* | 8/2017 | Khafagy | F02N 11/08 |
| 10,012,201 B1* | 7/2018 | Chen | F02N 11/0818 |
| 10,029,685 B1* | 7/2018 | Hubbard | B60W 30/146 |
| 2012/0089283 A1 | 4/2012 | Rauner et al. | |
| 2012/0179357 A1 | 7/2012 | Phillips | |
| 2013/0035839 A1 | 2/2013 | Otanez et al. | |
| 2013/0054063 A1* | 2/2013 | Maier | B60K 6/442 701/22 |
| 2013/0180500 A1 | 7/2013 | Nishina | |
| 2013/0245945 A1* | 9/2013 | Morita | G08G 1/096716 701/533 |
| 2014/0012450 A1* | 1/2014 | Laing | B60K 6/442 701/22 |
| 2015/0088373 A1* | 3/2015 | Wilkins | G05D 1/0234 701/36 |
| 2015/0258984 A1* | 9/2015 | Atluri | B60K 6/485 701/22 |
| 2016/0123261 A1 | 5/2016 | Shibata et al. | |
| 2016/0214608 A1* | 7/2016 | Packwood-Ace | B60W 30/143 |
| 2016/0221576 A1* | 8/2016 | Wang | B60W 30/14 |
| 2016/0247397 A1* | 8/2016 | Xu | G08G 1/0141 |
| 2016/0297422 A1* | 10/2016 | Jehle | B60L 15/20 |
| 2016/0375782 A1* | 12/2016 | Liu | B60L 53/63 320/109 |
| 2017/0001624 A1* | 1/2017 | Wang | B60W 20/40 |
| 2017/0080919 A1* | 3/2017 | Follen | F02N 11/0837 |
| 2017/0144664 A1* | 5/2017 | Yamashita | B60W 30/146 |
| 2017/0203655 A1* | 7/2017 | Miller | B60L 5/40 |
| 2017/0240160 A1* | 8/2017 | Park | B60K 6/442 |
| 2017/0282921 A1 | 10/2017 | Limbacher | |
| 2017/0305411 A1* | 10/2017 | Leone | F02D 41/0087 |
| 2017/0320482 A1* | 11/2017 | Leone | B60W 10/08 |
| 2018/0057001 A1* | 3/2018 | Hu | B60W 10/11 |
| 2018/0079314 A1* | 3/2018 | Kashyap | B60W 20/50 |
| 2018/0105158 A1* | 4/2018 | Namuduri | B60W 30/18127 |
| 2018/0141541 A1* | 5/2018 | Knaup | B60W 30/182 |
| 2018/0170383 A1* | 6/2018 | Flardh | B60W 40/13 |
| 2018/0273020 A1* | 9/2018 | Kruse | B60W 10/06 |
| 2020/0171974 A1* | 6/2020 | Ikeda | H01M 10/486 |

FOREIGN PATENT DOCUMENTS

| | | |
|---|---|---|
| DE | 102004024213 A1 | 12/2005 |
| DE | 102007036794 A1 | 2/2009 |
| DE | 102008064018 A1 | 7/2010 |
| DE | 102009046829 A1 | 5/2011 |
| DE | 102010038010 A1 | 4/2012 |
| DE | 102013100036 A1 | 7/2013 |
| DE | 112011104757 T5 | 11/2013 |
| DE | 102014014293 B3 | 11/2015 |
| EP | 1069311 A1 | 6/2000 |
| EP | 2722206 A1 | 4/2014 |
| EP | 3006698 A1 | 4/2016 |
| GB | 2519158 A | 4/2015 |
| JP | WO 2014192367 A1 | 4/2014 |
| JP | 2015024675 A | 2/2015 |
| WO | WO 2015/121546 A1 | 8/2015 |

OTHER PUBLICATIONS

International Search Report and Written Opinion of the International Searching Authority directed to related International Patent Application No. PCT/EP2015/001390, dated Nov. 22, 2016, with attached English-language translation; 25 pages.

First Chinese Office Action directed to related Chinese Patent Application No. CN201680055431, dated Apr. 22, 2019, with attached English-language translation; 13 pages.

* cited by examiner

METHOD FOR OPERATING A START-STOP SYSTEM AND A MOTOR VEHICLE

TECHNICAL FIELD

The invention relates to a method for operating a start-stop system of a motor vehicle, a drive motor being cut off when the speed falls below a speed threshold. In addition, the invention relates to a motor vehicle.

BACKGROUND

Motor vehicles are increasingly equipped with a start-stop system which is automatically cut off in certain situations and is switched on again at a later time as needed. The cut-off process can be triggered for example when a motor vehicle stops at a red light, during which time the electrical loads are supplied by a vehicle battery. It has already also been proposed to switch off the drive motor of a motor vehicle when the motor vehicle is moving, for example when driving down an incline or during a braking action until the vehicle stops.

DE 10 2009 046 829 A1 recommended a method for controlling a motor of a driving motor vehicle. In this respect road information or speed information is provided by a navigation system. Depending on the road information and the speed information, a motor cut off process is triggered.

From DE 10 2008 064 018 A1 a method is known for operating a start-stop system in which at least one piece of environmental information is used as an influencing variable to change or retain an operating state. This method is suited for a hybrid vehicle, in particular for a mild hybrid vehicle. Among other things, it provides that the cutting off or on of a drive motor occurs depending on falling below or exceeding a speed threshold.

The subsequently published DE 10 2014 014 293 B3 discloses a method for operating a motor vehicle having a start-stop system for an internal combustion engine of a motor vehicle with a device for registering the area in front of a vehicle, wherein the start-stop system stops the internal combustion engine when speed falls below a limit speed value depending on at least one signal relating to the driving dynamics of the vehicle. Here the internal combustion engine is not shut off if by means of the device for registering the area in front of the vehicle a lane irregularity is detected in the area in front of the vehicle that requires slower overtaking.

From DE 10 2004 024 213 B4 a method is known for controlling the operation of a motor vehicle with an internal combustion engine and automatic start-stop system that implements an automatic cut off system that comprises an automatic cut off system which in the presence of stop conditions implements an automatic cut off of the internal combustion engine and an automatic starting system which in the presence of start conditions implements an automatic start of the internal combustion engine. A first stop condition is present when at a vehicle speed below a predetermined speed threshold, actuation of the brake pedal occurs, wherein the first stop-condition comprises a vehicle speed below a speed threshold of more than 0 km/h and/or the speed threshold is provided depending on a selected gear.

DE 10 2010 038 010 A1 discloses an operating method for a hybrid vehicle in which driving occurs in pure electric motor mode, if among other things, a driving speed falls below a predefined limit value which can vary over time.

In conventional methods for operation of a start-stop system of the motor vehicle there is the problem that it is frequently difficult to decide whether cut off of the drive motor is helpful or not at a particular time.

BRIEF DESCRIPTION OF THE DRAWINGS/FIGURES

DETAILED DESCRIPTION

Figure 1:
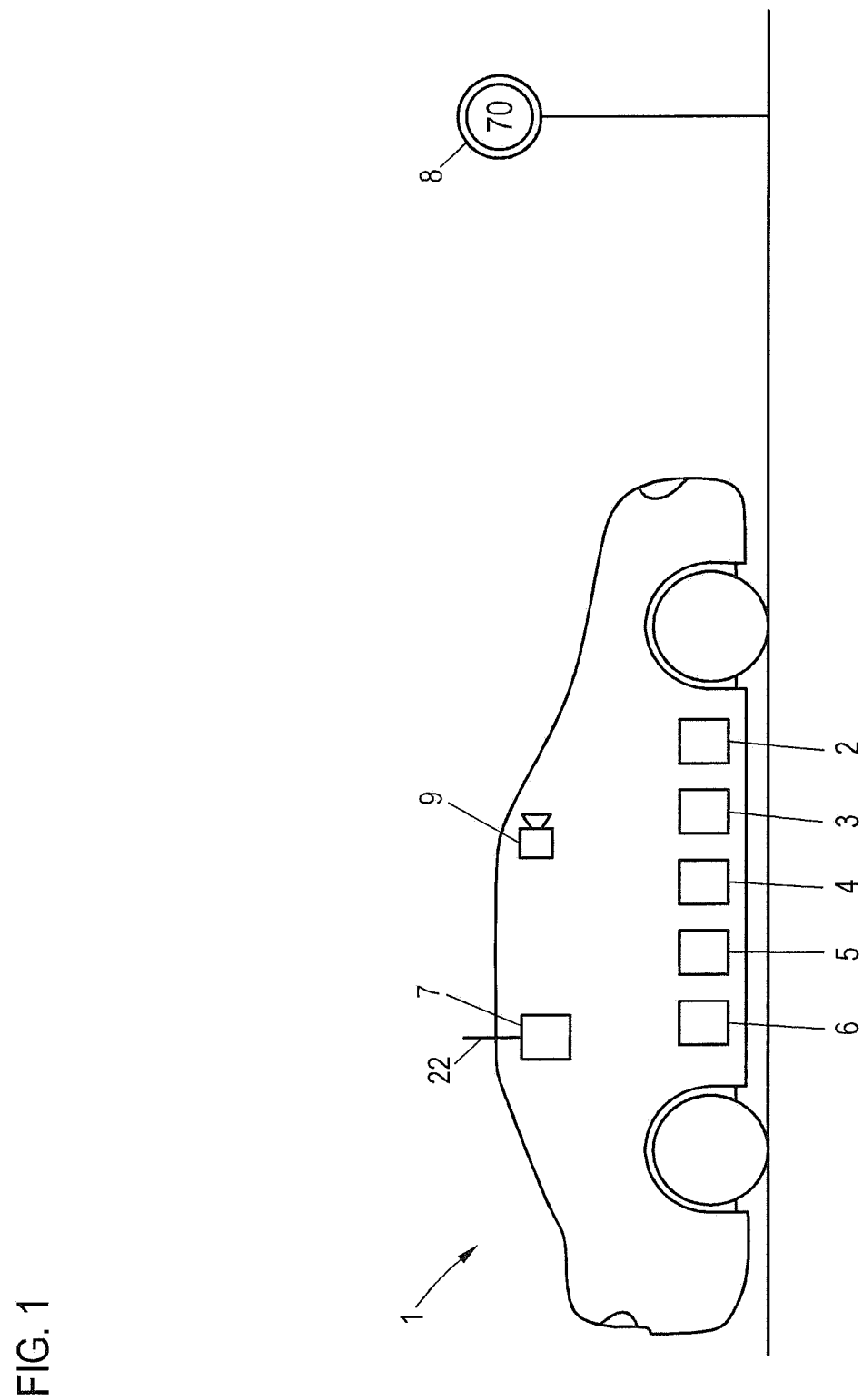
FIG. 1 illustrates a schematic representation of a motor vehicle according to one embodiment that is configured for implementation of the method according to the disclosure.

The invention therefore is based on the task of providing a possibility for operating a start-stop system that makes possible a sound decision about cutting off the drive motor.

To accomplish this task, with a method of the above-named type it is provided in accordance with the invention that the speed threshold be determined depending on at least one piece of environmental information.

The invention rests on the finding that a qualitatively improved operating method for a start-stop system can be created by providing a variable speed threshold that depends on at least one piece of current environmental information. In contrast to conventional methods which mostly provide a fixed speed threshold for an engine stop, in accordance with the invention there can be a flexible reaction to current driving situations, traffic situations, and environmental information. Thus, the method according to the invention for operating a start-stop system can react flexibly to current situations or conditions and in each case can select an appropriate speed threshold at which at least one drive motor is cut off when the vehicle falls below it.

The method according to the invention can be used for motor vehicles of the mild hybrid type which have a first internal combustion engine and at least one second electrical drive motor supporting the internal combustion engine, as well as a recuperative brake and the start-stop system, which switches off the least one drive motor when speed falls below a speed threshold. Such vehicles of the mild hybrid type cannot drive only by means of the electric motor, but this supports the internal combustion engine, so that a reduction in energy consumption is possible. In contrast to this, a vehicle of the full-hybrid type is configured such that it can be driven both by the internal combustion engine alone and by one or more electric motors. The line between a vehicle of the mild hybrid type and a vehicle of the full-hybrid type cannot be precisely drawn, however.

Various types of information may be considered as environmental information considered in establishing the speed threshold.

According to a first embodiment of the method according to the invention, it can be provided that data stored in a storage device of the navigation system can be considered as environmental information.

In particular this may be speed information, that is, established suggested speeds or maximum speeds that apply to a specific section of the roadway. This speed information can be loaded into the storage device of the navigation system so that they can be used during or before entering the relevant roadway section.

Preferably such a speed limit provided by a navigation system is considered to be environmental information. This consideration includes the determination of the speed threshold for cut off of the drive motor depending on the speed limit. The speed limit that applies to a specific section of roadway thus constitutes the maximal speed. The variable motor stop threshold is appropriately established such that it has a sufficient separation from the speed limit that constitutes a maximal speed.

An alternative embodiment of the method according to the invention provides that a speed limit acquired by an optical sensor of the motor vehicle is considered as environmental information. An optical sensor can for example be configured as a camera or as an arrangement of several cameras. By means of such an optical sensor, for example the speed limit provided on a sign can be acquired.

This gives the advantage that at any time the actually applicable speed limit is acquired even if the information contained in a storage device of the navigation system is no longer valid or current. Accordingly, by acquiring a traffic sign and evaluating the corresponding information as environmental information, an adjustment of the speed threshold can ensue.

A further variant of the method according to the invention provides that information received over a wireless communication connection such as traffic information or congestion information can be considered as environmental information or possibly as additional environmental information. Such information can be obtained for example from a central server that makes available current traffic information or congestion information. These can also be considered as environmental information as a maximal speed applicable to the respective roadway section. Such traffic information or congestion information alternatively or additionally can also be used by a local server or transmitter which for example transmits information only to a locally limited roadway region. For example, such a server or transmitter can be positioned on access roads of a city and traffic information or congestion information can be made available to vehicles passing the street. This traffic information or congestion information can be combined with further environmental information such as the applicable maximal speed or can be considered jointly in determining an adjusted speed threshold.

In the method according to the invention it can be provided for example that at a speed limit of 50 km/h or 70 km/h, the speed threshold for cut off of the drive motor is set at 25 km/h. If a vehicle is on a roadway section with a maximal speed of 50 km/h or 70 km/h and the vehicle is only moving at 25 km/h, it can be assumed that the driver is intentionally slowing the vehicle down because he intends to stop. In this situation the variably determined speed threshold is set to at 25 km/h so that the drive motor is cut off when speed drops below this speed threshold, thus saving drive energy.

Analogously it can be assumed that the driver driving his vehicle at a speed of just 10 km/h or less or has braked to that speed intends to bring the vehicle to a stop. In this situation therefore, the drive motor can be cut off. In the method according to the invention consequently it can be provided that the speed threshold for cutting off the drive motor when the speed limit is 30 km/h can be set at 10 km/h. Accordingly, the speed threshold in each case is variable, depending on a speed zone just passed, that is, depending on the maximal speed applicable to the respective driven roadway section.

In the method according to the invention it can be provided that the speed threshold in a traffic-calmed region is reduced to the extent that the cut off of the drive motor occurs only when stopping. In a traffic-calmed region, driving can be only at a stop-and-go speed. It is therefore reasonable to reduce the speed threshold when entering a traffic-calmed region to 0 km/h. After the traffic-calmed region has been passed, the variable speed threshold can be increased again however to the maximal speed applicable to the roadway section then being driven.

Apart from that the invention relates to a motor vehicle with a first internal combustion engine and at least a second electric drive motor supporting the internal combustion engine, a recuperative brake, and a start-stop system that is configured to cut off at least one drive motor when the speed falls below a speed threshold.

The motor vehicle according to the invention is characterized by the fact that it has a control device that is designed to set the speed threshold depending on at least one piece of environmental information. Thus, the speed threshold is made variable with allowance for the current environmental information, for example depending on an applicable maximal speed, depending on an acquired traffic sign, or depending on traffic information or congestion information. Optionally the motor vehicle has a recuperative brake.

The invention is explained below with reference to exemplary embodiments and to the drawings.

Figure 2:
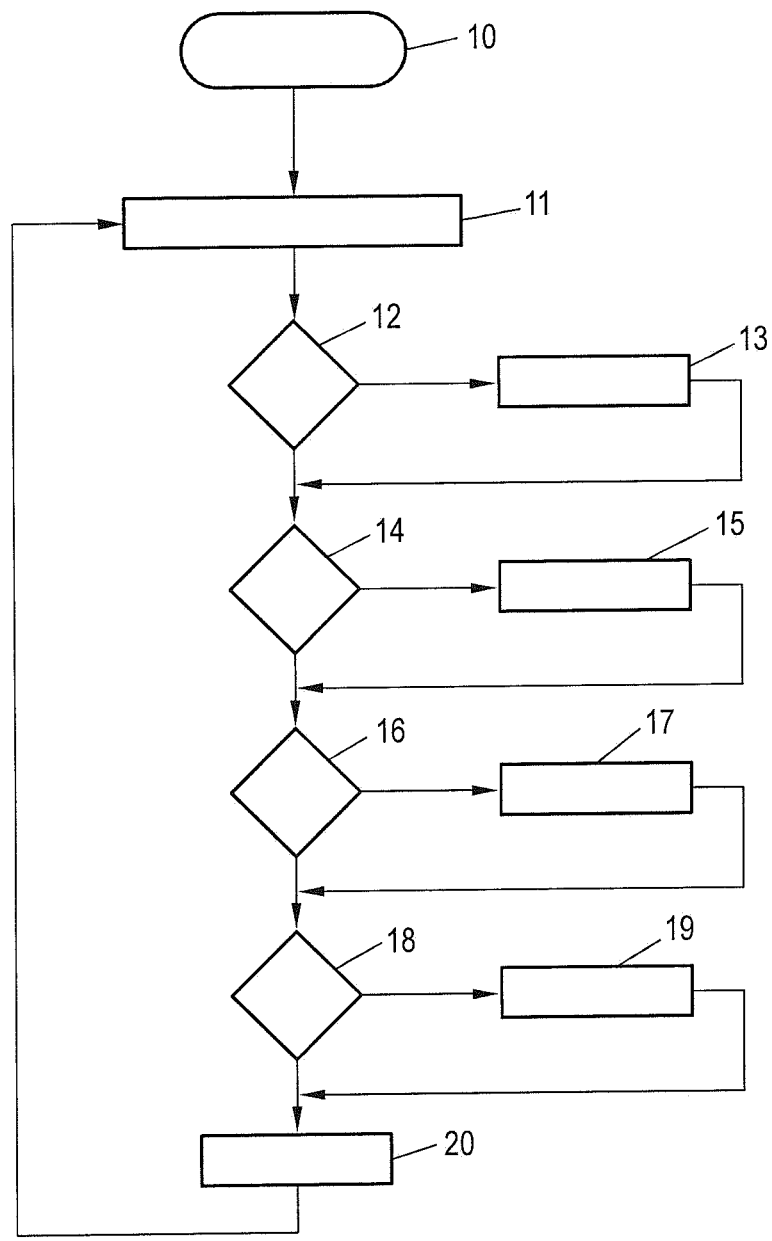
FIG. 2 illustrates a schematic representation of a flow diagram that depicts the steps of the method according to the disclosure.

The drawings are schematic representations and show:

FIG. 1 a motor vehicle according to the invention that is configured for implementation of the method according to the invention; and FIG. 2 a flow diagram that essentially shows the steps of the method according to the invention.

The motor vehicle 1 shown in FIG. 1 is a hybrid motor vehicle of the mild hybrid type with a first internal combustion engine 2 and a second drive motor configured as an electric motor 3. The motor vehicle 1 comprises a recuperative brake so that braking energy can be converted into electrical energy and subsequently into chemical energy, which is stored in a chargeable battery 4.

The motor vehicle 1 is provided with a schematically represented start-stop system 5 that switches off one or preferably both drive motors when speed falls below a speed threshold. The start-stop system 5 comprises a control device 6 that is configured to establish the speed threshold depending on at least one piece of environmental information.

Apart from that the motor vehicle comprises a receiving device 7 that is connected to an antenna 22. Over the receiving device 7 the motor vehicle 1 can receive environmental information such as traffic information or congestion information which is transmitted wirelessly by a transmitter (not shown). In agreement with a conventional motor vehicle, the start-stop system 5 is configured such that at least one of the two drive motors, preferably both drive motors, namely the internal combustion engine 2 and the electric motor 3 is or are cut off. Furthermore, in the motor vehicle 1 it is provided that the speed threshold be established depending on at least one piece of environmental information.

In FIG. 1 it can be seen that the motor vehicle is approaching a traffic sign 8 that is acquired by a schematically represented optical sensor 9 which is configured as a camera. An image registered by the camera is evaluated so that the meaning of the traffic sign 8 can be acquired. This meaning content of the traffic sign 8 is considered as current environmental information in setting the variable speed threshold for cut off of the drive motor.

In addition, the start-stop system 5 can receive traffic information wirelessly via its receiving device 7. This traffic information is considered as further environmental information. This indicates whether or on what course sections or roadway sections a traffic problem such as sluggish traffic movement or congestion is present. This traffic information can include further detail information, for example a current average speed of the drivers, the length of the congested roadway, as well as information about whether the congestion is growing or shrinking. This information along with the information relating to the traffic sign is evaluated. The control device 6 considers the diverse environmental information and modifies the variable speed threshold. If the traffic is flowing unimpeded, it is assumed that most of the drivers are moving at a speed between the maximal speed indicated on the traffic sign 8 and a lower speed. The lower speed value can for example be 20 km/h below the maximal speed. If the driver of the motor vehicle 1 falls below this lower speed it is assumed that he wants to bring the motor vehicle 1 to a stop. Therefore, the speed threshold can be reduced to 50 km/h or a lower value, for example 45 km/h. But if traffic information was received over the receiving device 7, according to which traffic is sluggish on the roadway ahead of the motor vehicle 1, the control device 6 of the start-stop system 5 reduces the speed threshold from 45 km/h to 20 km/h, as in sluggish traffic frequent cut off processes of the drive motor are not desired or are not reasonable from the energy standpoint.

The start-stop system 5 permanently monitors the environmental information acquired by the side sensors as well as the environmental information received wirelessly by means of the receiving device 7 and adjusts the speed threshold depending on the current driving situation, the current traffic situation, and depending on the planned route in order to avoid unnecessary motor stops. The motor vehicle 1 comprises a belt-driven starter generator that combines the function of an electrical starter and a generator.

The method for operating the start-stop system is explained below with reference to the flow diagram of FIG. 2. After the start 10 of the method, environmental information is acquired in step 11. Then in step 12 it is determined whether a side navigation system shows environmental information of the currently traveled roadway section. If it has been determined in step 12 that the corresponding speed information has been loaded into a storage device of the navigation device, the maximal speed allocated for the roadway section is registered in step 13. This maximal speed is considered as environmental information in determination of the speed threshold for cutting off the drive motor.

Subsequently in step 14 it is determined whether one or more traffic signs 8 can be acquired. In step 15 a currently applicable maximal speed is acquired by an image assessment of the recorded traffic sign, as was described in connection with FIG. 1. If there is a contradiction, i.e. if the maximal speed obtained from the navigational data and the maximal speed obtained from the traffic sign evaluation deviate from one another, the maximal speed registered by the traffic sign evaluation is considered, as it is assumed that this possesses higher credibility and currency.

In step 16 it is determined whether environmental information in the form of traffic information is present or can be accessed. As already explained, such information can be received by means of the receiving device 7 via a wireless communication connection. In a modified form this can also be non-targeted transmitted traffic information. If such traffic information is received in step 16, this is considered in step 17 as further environmental information in the following determination or adjustment of speed threshold.

Finally, in step 18 it is determined whether traffic backup information is available or can be accessed. If the answer is yes, such traffic backup information is considered in step 19 as further environmental information for setting the speed threshold.

Subsequently in step 20 the speed threshold, i.e. the variable speed threshold is determined depending on all received and acquired environmental information. First of all, the calculation of the speed threshold incorporates information regarding speed zones, in particular the acquired maximal speed. For a speed limit of 50 km/h or 70 km/h the speed threshold for cut off of the drive motor is set to 25 km/h. For a set maximal speed for the currently traveled roadway section of 30 km/h, the speed threshold is set at 10 km/h. In a traffic-calmed area the speed threshold is reduced to 0 km/h, so that the cut off does not occur until the vehicle is stopped. Furthermore current, acquired, or received traffic information and/or backup information is incorporated in the calculation of the speed threshold. This speed threshold then forms the basis for the cut off of the drive motor or motors by the start-stop system 5. Then the method shown in FIG. 2 branches off to step 11 in which the environmental information is acquired and the method is run through again.

The described motor vehicle and the described method have the advantage that a motor cut off is always implemented depending on the current environmental information, wherein motor cut offs that do not result in energy savings are avoided.

The invention claimed is:

1. A method for operating a start-stop system of a motor vehicle, the method comprising:
   setting a speed threshold for operating the start-stop system based at least on environment information, wherein the environment information comprises a speed limit provided by a navigation system or acquired by an optical sensor of the motor vehicle; and
   cutting off a drive motor in response to a speed of the motor vehicle being less than the speed threshold.

2. The method according to claim 1, wherein the setting the speed threshold comprises:
   at the speed limit of 50 km/h or 70 km/h, setting the speed threshold for cutting off the drive motor at 25 km/h.

3. The method according to claim 1, wherein the setting the speed threshold comprises:
   at the speed limit of 30 km/h, setting the speed threshold for cutting off the drive motor at 10 km/h.

4. The method according to claim 1, wherein the setting the speed threshold comprises:
   reducing the speed threshold in a traffic-calmed area such that cutting off of the drive motor does not occur until standstill of the motor vehicle.

5. The method according to claim 1, wherein the environment information comprises information acquired via a wireless communication connection.

6. A vehicle, comprising:
   a first drive motor comprising an internal combustion engine;
   at least one second drive motor comprising an electric drive motor supporting the internal combustion engine;
   a recuperative brake;
   a start-stop system configured to cut off at least one of the first and second drive motor in response to a speed of the vehicle being less than a speed threshold; and
   a control device configured to set the speed threshold for operating the start-stop system based at least on the environment information, wherein the environment information comprises a speed limit provided by a navigation system or acquired by an optical sensor of the vehicle.

7. The vehicle according to claim 6, wherein, at the speed limit of 50 km/h or 70 km/h, the control device is configured to set the speed threshold for cutting off at least one of the first and second drive motor at 25 km/h.

8. The vehicle according to claim 6, wherein, at the speed limit of 30 km/h, the control device is configured to set the speed threshold for cutting off at least one of the first and second drive motor at 10 km/h.

9. The vehicle according to claim 6, wherein the control device is further configured to reduce the speed threshold in a traffic-calmed area such that cutting off at least one of the first and second drive motor does not occur until standstill of the vehicle.

10. The vehicle according to claim 6, wherein the environment information comprises information acquired via a wireless communication connection.

* * * * *